United States Patent
Taguchi et al.

[11] Patent Number: 5,863,989
[45] Date of Patent: Jan. 26, 1999

[54] CURABLE RESIN COMPOSITION

[75] Inventors: Koichi Taguchi; Hiroshi Suto, both of Shibukawa, Japan

[73] Assignee: Denki Kagaku Kogyo Kabushiki Kaisha, Tokyo, Japan

[21] Appl. No.: 840,851

[22] Filed: Apr. 17, 1997

[30] Foreign Application Priority Data

Apr. 18, 1996 [JP] Japan .................. 8-096457

[51] Int. Cl.$^6$ .................. C08F 299/02; C08F 290/06; C09J 4/00; C09J 5/00
[52] U.S. Cl. .................. 525/245; 525/259; 525/263; 525/264; 526/227; 526/313; 526/319; 526/320; 526/326; 526/329.6
[58] Field of Search .................. 526/227, 313, 526/319, 320, 326, 329.6; 525/245, 259, 263, 264

[56] References Cited

U.S. PATENT DOCUMENTS

| | | |
|---|---|---|
| 4,226,954 | 10/1980 | Pelosi . |
| 5,310,835 | 5/1994 | Skoultchi et al. .................. 526/198 |
| 5,466,723 | 11/1995 | Dotson .................. 522/96 |

FOREIGN PATENT DOCUMENTS

WO 94 09050 A  4/1994  WIPO .

OTHER PUBLICATIONS

Patent Abstracts of Japan, vol. 016, No. 413 (C–0980), Sep. 1992 & JP 04 142322 A (Touyou Kasei Kougiyou KK), May 15, 1992.
Database WPI, Derwent Publications, AN–82–58200, JP–A–57–090073, Jun. 4, 1982.
Database WPI, Derwent Publications, AN–83–791749, JP–A–58152076, Sep. 9, 1983.
Database WPI, Derwent Publications, AN–82–56233, JP–A–57–087484, May 31, 1982.
Database WPI, Derwent Publications, AN–82–62820, JP–A–57–100168, Jun. 22, 1982.
Database WPI, Derwent Publications, AN–86–085951, JP–A–61–034082, Feb. 18, 1986.

*Primary Examiner*—Jeffrey C. Mullis
*Attorney, Agent, or Firm*—Oblon, Spivak, McClelland, Maier & Neustadt, P.C.

[57] ABSTRACT

A curable resin composition comprising:

(1) a polymerizable vinyl monomer having a structure of the formula (A):

$$Z-R-(R_2O)_p-R_1 \quad (A)$$

wherein Z is a (meth)acryloyl group, $R_1$ is a phenyl group or a phenyl group having a $C_{1-3}$ alkyl group, $R_2$ is $-C_2H_4-$, $-C_3H_6-$, $-CH_2CH(CH_3)-$, $-C_4H_8-$ or $-C_6H_{12}-$, and p is an integer of from 1 to 10 and wherein R is a direct bond, (2) a polymerizable vinyl monomer having a structure of the formula (B):

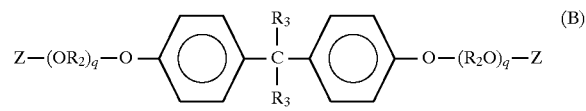

wherein Z and $R_2$ are as defined above, $R_3$ is hydrogen or a $C_{1-4}$ alkyl group, and q is an integer of from 0 to 8, (3) a polymerizable vinyl monomer having a structure of the formula (C):

$$Z-O-(R_2O)_p-H \quad (C)$$

wherein Z, $R_2$ and p are as defined above, (4) an organic peroxide, and
(5) a reducing agent.

21 Claims, No Drawings

CURABLE RESIN COMPOSITION

The present invention relates to a curable resin composition, particularly an adhesive composition, containing polymerizable vinyl monomers, which has a low odor and is excellent in durability and moisture resistance.

There is an increasing demand for a cold quick-curing adhesive which is curable at a normal or room temperature in a short period of time, with a view to labour-saving, resource-saving and energy-saving. Heretofore, as a cold quick-curing adhesive, a two-pack type quick-curable epoxy adhesive, an anaerobic adhesive, an instantaneous adhesive or a second generation acrylic adhesive (SGA) has been known.

The two-pack type quick-curing epoxy adhesive is designed so that a main agent and a curing agent are weighed, mixed and coated on an adherend, whereupon the adhesive cures by the reaction of the main agent and the curing agent. However, such a two-pack type quick-curing epoxy adhesive has had a drawback that if weighing or mixing of the main agent and the curing agent is inadequate, the bond strength is likely to be remarkably low, and even if weighing and mixing are adequately carried out, the peel strength and impact strength tend to be low.

The anaerobic adhesive is designed so that the adhesive composition is pressed between adherends to cut off air for curing. However, it has a drawback that if a part of the adhesive composition is squeezed out at the time of pressing, such a squeeze-out portion will be in contact with air and will not be cured. Further, it has another drawback that it is not curable when a clearance between adherends is large.

The instantaneous adhesive usually comprises cyanoacrylate as the main component and is excellent in the operation efficiency. However, it has had a drawback that the peel strength or impact strength is low. Further, the moisture resistance or water resistance is poor, whereby the range of its application is limited.

SGA is a two-pack type. Nevertheless, it requires no accurate weighing of the two liquids, and it cures at room temperature in a few or a few tens minutes even when weighing or mixing is inadequate, in some cases, simply by contacting the two liquids, without requiring accurate weighing of the two liquids. Accordingly, it is excellent in the operation efficiency, and yet SGA provides high peel strength or impact strength, and curing of the squeeze-out portion is also good. For this reason, it is widely employed. However, such SGA employs a highly volatile and strongly odorous alkyl (meth)acrylate such as methyl methacrylate as a polymerizable vinyl monomer and thus has a strong odor and flammability, which has been a serious problem from the viewpoint of working environment.

To overcome these drawbacks, JP-A-55-71770, JP-A-57-87484, JP-A-57-90073, JP-A-57-100168, JP-A-58-152076 and JP-A-61-34082 disclose adhesive compositions containing high boiling point polymerizable vinyl monomers. By these adhesive compositions, problems of volatility and flammability have been solved, but there still remain problems that they have an odor and poor in durability and moisture resistance, and they are hardly useful for bonding commercial products or parts.

Recently, it has been required to develop an adhesive composition which has a low odor and flammability from the viewpoint of working environment and which is excellent in durability and moisture resistance.

The present inventors have conducted an extensive study to solve these problems and as a result have found it possible to obtain a curable resin composition having a low odor and excellent durability by combining certain specific polymerizable vinyl monomers. The present invention has been accomplished on the basis of this discovery.

Namely, the present invention provides a curable resin composition comprising:

(1) a polymerizable vinyl monomer having a structure of the formula (A):

$$Z-R-(R_2O)_p-R_1 \qquad (A)$$

wherein Z is a (meth)acryloyl group, $R_1$ is a phenyl group or a phenyl group having a $C_{1-3}$ alkyl group, $R_2$ is $-C_2H_4-$, $-C_3H_6-$, $-CH_2CH(CH_3)-$, $-C_4H_8-$ or $-C_6H_{12}-$, and p is an integer of from 1 to 10, (2) a polymerizable vinyl monomer having a structure of the formula (B):

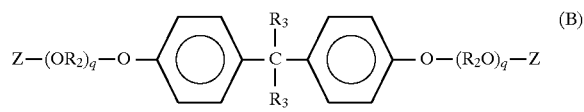

wherein Z and $R_2$ are as defined above, $R_3$ is hydrogen or a $C_{1-4}$ alkyl group, and q is an integer of from 0 to 8, (3) a polymerizable vinyl monomer having a structure of the formula (C):

$$Z-O-(R_2O)_p-H \qquad (C)$$

wherein Z, $R_2$ and p are as defined above, (4) an organic peroxide, and (5) a reducing agent.

The curable resin composition may further contain (6) an elastomer component, and the reducing agent (5) in the composition is preferably a metal salt.

Further, the curable resin composition is preferably a two-pack type curable resin composition comprising a first liquid and a second liquid, wherein the first liquid contains the organic peroxide, and the second liquid contains the reducing agent.

Further, the present invention provides a cured product of such a curable resin composition, and a bonded product comprising adherends bonded by the cured product.

Further, the present invention provides a method for bonding adherends, which comprises using the curable resin composition.

Now, the present invention will be described in detail with reference to the preferred embodiments.

The polymerizable vinyl monomer (1) to be used in the present invention has a structure of the following formula (A):

$$Z-R-(R_2O)_p-R_1 \qquad (A)$$

wherein Z is a (meth)acryloyl group, $R_1$ is a phenyl group or a phenyl group having a $C_{1-3}$ alkyl group, $R_2$ is $-C_2H_4-$, $-C_3H_6-$, $-CH_2CH(CH_3)-$, $-C_4H_8-$ or $-C_6H_{12}-$, and p is an integer of from 1 to 10.

The polymerizable vinyl monomer (1) having a structure of the formula (A) may, for example, be phenoxyethyl (meth)acrylate, phenoxydiethylene glycol (meth)acrylate, phenoxypolyethylene glycol (meth)acrylate, phenoxypropyl (meth)acrylate, phenoxydipropylene glycol (meth)acrylate or phenoxypolypropylene glycol (meth)acrylate.

The amount of the polymerizable vinyl monomer having a structure of the formula (A) is preferably from 20 to 85 parts by weight, more preferably from 35 to 70 parts by weight, per 100 parts by weight of the total amount of components (1), (2) and (3). If the amount is less than 20 parts by weight, the bonding properties may tend to be low, and if it exceeds 85 parts by weight, the bonding properties may also tend to be low.

The polymerizable vinyl monomer (2) to be used in the present invention has a structure of the formula (B):

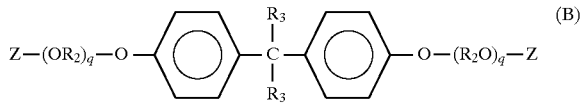

wherein Z and $R_2$ are as defined above, $R_3$ is hydrogen or a $C_{1-4}$ alkyl group, and q is an integer of from 0 to 8.

The polymerizable vinyl monomer (2) having a structure of the formula (B) may, for example, be 2,2-bis(4-(meth)acryloxyphenyl)propane, 2,2-bis(4-(meth)acryloxyethoxyphenyl)propane, 2,2-bis(4-(meth)acryloxydiethoxyphenyl)propane, 2,2-bis(4-(meth)acryloxypropoxyphenyl)propane, 2,2-bis(4-(meth)acryloxytetraethoxyphenyl)propane or 2,2-bis(4-(meth)acryloxypolyethoxyphenyl)propane.

The amount of the polymerizable vinyl monomer having a structure of the formula (B) is preferably from 5 to 30 part by weight, more preferably from 10 to 25 parts by weight, per 100 parts by weight of the total amount of components (1), (2) and (3). If the amount is less than 5 parts by weight, the bonding properties may tend to be low, and if it exceeds 30 parts by weight, the bonding properties may also tend to be low.

In the present invention, (3) a polymerizable vinyl monomer having a structure of the formula (C) is incorporated. The polymerizable vinyl monomer (3) has a structure of the following formula (C):

wherein Z, $R_2$ and p are as defined above with respect to component (1).

The polymerizable vinyl monomer (3) having a structure of the formula (C) may, for example, be 2-hydroxyethyl (meth)acrylate, 2-hydroxypropyl (meth)acrylate, diethylene glycol mono(meth)acrylate or polypropylene glycol (meth) acrylate.

The amount of the polymerizable vinyl monomer having a structure of the formula (C) is preferably from 10 to 50 parts by weight, more preferably from 20 to 40 parts by weight, per 100 parts by weight of the total amount of components (1), (2) and (3). If the amount is less than 10 parts by weight, the bonding properties may tend to be low, and if it exceeds 50 parts by weight, the humidity resistance may tend to be low.

The organic peroxide (4) to be used in the present invention may, for example, be cumene hydroperoxide, paramenthane hydroperoxide, tert-butyl hydroperoxide, diisopropylbenzene dihydroperoxide, methyl ethyl ketone peroxide, benzoyl peroxide or tert-butyl peroxybenzoate. Among them, cumene hydroperoxide is preferred from the viewpoint of the reactivity.

The amount of the organic peroxide is preferably from 0.5 to 10 parts by weight, more preferably from 1 to 7 parts by weight, per 100 parts by weight of the total amount of components (1), (2) and (3). If the amount is less than 0.5 part by weight, the curing speed tends to be slow, and if it exceeds 10 parts by weight, the storage stability may tend to be poor.

The reducing agent (5) to be used in the present invention may be any conventional reducing agent which reacts with the above organic peroxide to form radicals. Typical reducing agents include tertiary amines, thiourea derivatives and metal salts.

The tertiary amines include, for example, triethylamine, tripropylamine, tributylamine and N,N-dimethyl p-toluidine. The thiourea derivatives include, for example, 2-mercaptobenzimidazole, methylthiourea, dibutylthiourea, tetramethylthiourea and ethylenethiourea. The metal salts include, for example, cobalt naphthenate, copper naphthenate and vanadyl acetylacetonate. Among them, metal salts are preferred, and vanadyl acetylacetonate is particularly preferred, from the viewpoint such that the surface curing property of a surface portion squeezed out from the adherends is good. If a thiourea derivative is used, the surface of a squeeze-out portion becomes sticky without curing, whereby the surface curing property tends to be poor.

The amount of the reducing agent is preferably from 0.05 to 10 parts by weight, more preferably from 0.1 to 8 parts by weight, per 100 parts by weight of the total amount of components (1), (2) and (3). If the amount is less than 0.05 part by weight, the curing speed tends to be slow, and if it exceeds 10 parts by weight, an unreacted reducing agent tends to remain, whereby the bond strength tends to be low.

In the foregoing, the components to be used in the present invention have been described. However, the following less odorous polymerizable vinyl monomers may further be incorporated to the curable resin composition of the present invention.

① A (meth)acrylic acid ester of a higher alcohol

As such a polymerizable vinyl monomer, a (meth)acrylic acid ester of a higher aliphatic alcohol such as 2-ethylhexyl (meth)acrylate, lauryl (meth)acrylate or stearyl (meth) acrylate, dicyclopentanyloxyalkyl (meth)acrylate, dicyclopentenyloxyalkyl (meth)acrylate, or a (meth)acrylic acid ester of a monoether alcohol such as ethylene glycol, may, for example, be mentioned.

② A (meth)acrylic acid ester of a polyhydric alcohol

As such a polymerizable vinyl monomer, trimethylolpropane tri(meth)acrylate, neopentyl glycol di(meth)acrylate, pentaerythritol tetra(meth)acrylate, or dipentaerythritol hexa (meth)acrylate, may, for example, be mentioned.

③ A urethane prepolymer having (meth)acryloyloxy groups

Such a polymerizable vinyl monomer can be obtained, for example, by reacting a (meth)acrylic acid ester having a hydroxyl group, an organic polyisocyanate and a polyhydric alcohol.

Here, the (meth)acrylic acid ester having a hydroxyl group may, for example, be hydroxyethyl (meth)acrylate, hydroxypropyl (meth)acrylate or hydroxybutyl (meth) acrylate.

The organic polyisocyanate may, for example, be toluene diisocyanate, 4,4-diphenylmethane diisocyanate, hexamethylene diisocyanate or isophorone diisocyanate.

The polyhydric alcohol may, for example, be polyethylene glycol, polypropylene glycol, polytetramethylene glycol or polyester polyol.

④ An acid phosphate compound of the following formula (D)

wherein R is $CH_2=CR_4CO(OR_5)_m-$ (wherein $R_4$ is hydrogen or a methyl group, $R_5$ is $-C_2H_4-$, $-C_3H_6-$, $-CH_2CH(CH_3)-$, $-C_4H_8-$, $-C_6H_{12}-$ or

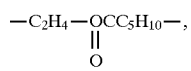

and m is an integer of from 1 to 10), and n is 1 or 2.

The acid phosphate compound of the formula (D) may, for example, be acid phosphoxyethyl (meth)acrylate, acid phosphoxypropyl (meth)acrylate or bis(2-(meth)acryloyloxyethyl)phosphate.

Among these, the acid phosphate compound ④ of the formula (D) is preferred from the viewpoint of the bonding properties. The amount of the acid phosphate compound of the formula (D) is preferably from 0.05 to 10 parts by weight, more preferably from 0.1 to 7 parts by weight, per 100 parts by weight of the total amount of components (1), (2) and (3), from the viewpoint of the bonding properties.

In the present invention, it is preferred to incorporate an elastomer component (6) to the curable resin composition in order to improve the peel strength and the impact strength. The elastomer component is a polymer substance which has rubber elasticity at room temperature. For example, an elastomer component which can be dissolved or dispersed in the polymerizable monomers is preferred. Such an elastomer component includes various synthetic rubbers such as a methyl methacrylate- butadiene-styrene copolymer (MBS), an acrylonitrile-styrene-butadiene copolymer, a linear polyurethane, acrylonitrile-butadiene rubber, a styrene-butadiene rubber, a chloroprene rubber and a butadiene rubber, and natural rubbers. Among them, an acrylonitrile-butadiene rubber is preferred from the viewpoint of the solubility in polymerizable vinyl monomers and the bonding properties. Such elastomer components may be used alone or in combination of two or more of them so long as the compatibility is good.

The amount of the elastomer component of the present invention is preferably from 5 to 35 parts by weight, more preferably from 10 to 30 parts by weight, per 100 parts by weight of the total amount of component (1), (2) and (3). If the amount is less than 5 parts by weight, the viscosity and the bonding properties tend to be low, and if it exceeds 35 parts by weight, the viscosity tends to be so high that the operation tends to be difficult.

For the purpose of adjusting the viscosity or fluidity, a thermoplastic polymer such as chlorosulfonated polyethylene, polyurethane, a styrene-acrylonitrile copolymer or polymethyl methacrylate, or fine silica powder, may, for example, be used.

Further, to facilitate curing of a portion which is in contact with air, various paraffins may be incorporated to the curable resin composition of the present invention. Such paraffins include, for example, paraffin, microcrystalline wax, carnauba wax, bee wax, lanoline, whale wax, ceresin and candelilla wax.

The amount of such paraffins is preferably from 0.1 to 5 parts by weight, more preferably from 0.3 to 2.5 parts by weight, per 100 parts by weight of the total amount of components (1), (2) and (3). If the amount is less than 0.1 part by weight, curing of a portion which is in contact with air, tends to be poor. On the other hand, if it exceeds 5 parts by weight, the bond strength tends to be low.

Further, for the purpose of improving storage stability, various antioxidants including a polymerization inhibitor, may be used. The antioxidants include, for example, hydroquinone, hydroquinone monomethylether, 2,6-ditert-butyl-p-cresol, 2,2'-methylenebis (4-methyl-6-tert-butylphenol), triphenylphosphite, phenothiazine and N-isopropyl-N'-phenyl-$_p$-phenylenediamine.

The amount of the polymerization inhibitor is preferably from 0.001 to 3 parts by weight, more preferably from 0.01 to 1 part by weight, per 100 parts by weight of the total amount of components (1), (2) and (3). If the amount is less than 0.001 part by weight, no substantial effect tends to be obtained, and if it exceeds 3 parts by weight, the bond strength tends to be low. In addition, known additives such as a plasticizer, a filler, a colorant and a rust-preventing agent may also be incorporated, as the case requires.

As a practical embodiment of the present invention, the curable resin composition is preferably used as an adhesive composition. In this case, it may, for example, be used as a two-pack type adhesive composition. In the case of the two-pack type, not all of the essential components of the adhesive composition of the present invention are mixed for storage. Namely, the adhesive composition is divided into a first liquid and a second liquid, and the organic peroxide is stored in the first liquid, and the reducing agent is separately stored in the second liquid. In this case, the two liquids are used as a two-pack type adhesive composition by simultaneously or separately coating them for contact and curing.

As another embodiment, polymerizable vinyl monomers and other optional components are preliminarily incorporated to one or both of the first and the second liquids, and the two are mixed at the time of curing and thus used as a one-pack type adhesive composition. Among these embodiments, it is preferred to use as a two-pack type adhesive composition in view of the excellent storage stability.

In the present invention, adherends will be bonded by a cured product of the curable resin composition to obtain a bonded product. The adherends may be of various materials such as paper, wood, ceramics, glass, porcelain, rubber, plastics, mortar, concrete and metals without any particular limitation. However, the composition shows particularly excellent bonding properties when the adherends are made of a metal.

Now, the present invention will be described in further detail with reference to Examples. However, it should be understood that the present invention is by no means restricted by such specific Examples. In the following description, the amounts of various materials are represented by parts by weight. With respect to various material, 2,2-bis(4-methacryloxypolyethoxyphenyl)propane of the formula (B) wherein q is 5, was used, moderate high nitrile was used as an acrylonitrile-butadiene rubber, and BTAIIIN2 manufactured by Kureha Chemical Co., Ltd. was used as a butadiene-styrene-methyl methacrylate copolymer.

Various physical properties were measured as follows.

Tensile shear strength

In accordance with JIS K-6850, in an environment with a humidity of 50% at a temperature of 23° C., a curable resin composition was coated on one side of a test specimen (a non-treated steel plate of SPCC-D of 100×25×1.6 mm or an aluminum A-5052 sand blast treated steel plate of 100×25×2.0 mm), and another test specimen was bonded thereto. In the case of a two-pack type curable resin composition, a first liquid was coated on one side of a test specimen and a second liquid was coated on another specimen, and they are immediately bonded to each other so that the coated sides faced each other.

Then, after aging at room temperature for 24 hours, the bonded product was used as a test sample for measuring the tensile shear strength.

The tensile shear strength (unit: MPa) of the sample was measured in an environment with a humidity of 50% at a temperature of 23° C. at a tensile rate of 10 mm/min.

Peel strength

In accordance with JIS K-6854, in an environment with humidity of 50% at a temperature of 23° C., a curable resin composition was coated on one side of a test specimen (a non-treated steel plate of SPCC-D of 200×25×1.6 mm), and another test specimen was bonded thereto. In a case of a two-pack type curable resin composition, a first liquid was coated on one side of a test specimen, and a second liquid was coated on another test specimen (a non-treated steel plate of SPCC-D of 200×25×0.4 mm). Then, they were immediately bonded so that the coated sides faced each other.

Then, the bonded product was aged at room temperature for 24 hours and used as a sample for measuring the peel strength. To make the thickness of the curable resin composition layer uniform, a very small amount of glass beads having a particle size of 100 μm were added. With respect to the peel strength (unit: KN/m) of the sample, T peel strength was measured in an environment with a humidity of 50% at a temperature of 23° C. at a tensile rate of 100 mm/min.

Tensile shear strength retention under humidity

As an item for evaluating the bond durability, the tensile shear strength retention under humidity was measured.

The aluminum specimen for measuring the tensile shear strength was left to stand for 1 week in an environment with a humidity of 98% at a temperature of 50° C. and then taken out, and the tensile shear strength was measured in an environment with a humidity of 50% at a temperature of 23° C. The ratio of the tensile shear strength exposed in an environment with a humidity of 98% at a temperature of 50° C. to the tensile shear strength exposed under an environment with a humidity of 50% at a temperature of 23° C., was taken as the tensile shear strength retention under humidity (unit: %).

Odor

Degree of the odor of each curable resin composition was evaluated under the following standards:

○: Substantially no odor x: Distinct odor

EXAMPLES 1 to 3 and COMPARATIVE EXAMPLE 1

Various materials except for cumene hydroperoxide were mixed in the amounts as identified in Table 1 to obtain a liquid composition. Then, cumene peroxide was mixed thereto, and the mixture was immediately used for bonding. The results of measurements are also shown in Table 1.

Comparative Example 1 represents a conventional adhesive which had adequate bonding properties but had a strong odor of methyl methacrylate.

TABLE 1

| Materials | Ex. 1 | Ex. 2 | Ex. 3 | Comp. Ex. 1 |
|---|---|---|---|---|
| Amount (unit: parts by weight) | | | | |
| Component (1) | | | | |
| Phenoxyethyl methacrylate | 40.0 | 40.0 | 60.0 | |
| Component (2) | | | | |
| 2,2-Bis(4-methacryloxyethoxyphenyl)propane | | | 20.0 | 20.0 |
| 2,2-Bis(4-methacryloxypolyethoxyphenyl)propane | 10.0 | 10.0 | | |
| Component (3) | | | | |
| 2-Hydroxyethyl methacrylate | 30.0 | 30.0 | 20.0 | 20.0 |
| 2-Hydroxypropyl methacrylate | 20.0 | 20.0 | | |

TABLE 1-continued

| Materials | Ex. 1 | Ex. 2 | Ex. 3 | Comp. Ex. 1 |
|---|---|---|---|---|
| Component (4) | | | | |
| Cumene hydroperoxide | 2.3 | 3.7 | 2.3 | 2.3 |
| Component (5) | | | | |
| Vanadyl acetylacetonate | 0.4 | | 0.4 | 0.4 |
| Ethylenethiourea | | 1.2 | | |
| Component (6) | | | | |
| Acrylonitrile-butadiene rubber | | 15.0 | 10.0 | 10.0 |
| Butadiene-styrene-methyl methacrylate copolymer | | | 10.0 | 10.0 |
| Others | | | | |
| Paraffin | | | 1.2 | |
| Methyl methacrylate | | | | 60.0 |
| Evaluation | | | | |
| SPCC/SPCC Tensile shear strength (MPa) | 9.6 | 21.2 | 25.7 | 26.6 |
| Aluminum/aluminum Tensile shear strength (MPa) | 70.1 | 20.0 | 24.5 | 23.2 |
| Tensile shear strength retention under humidity (%) | 83.0 | 90.0 | 92.4 | 98.0 |
| Odor | ○ | ○ | ○ | X |

EXAMPLES 4 to 14 and COMPARATIVE EXAMPLE 2

Various material were mixed in the amounts as identified in Tables 2 and 3 to prepare a curable resin composition comprising a first liquid and a second liquid. The results of measurements are also shown in Tables 2 and 3.

Comparative Example 2 represents a conventional adhesive, which was poor in humidity resistance and did not show practical durability, although the odor was very weak.

TABLE 2

| Materials | Ex. 4 | Ex. 5 | Ex. 6 | Ex. 7 |
|---|---|---|---|---|
| Amounts (unit: parts by weight) | | | | |
| First liquid | | | | |
| Component (1) | | | | |
| Phenoxyethyl methacrylate | 50.0 | | 50.0 | 40.0 |
| Tolyloxyethyl methacrylate | | 50.0 | | |
| Component (2) | | | | |
| 2,2-Bis(4-methacryloxyethoxyphenyl)propane | 20.0 | 20.0 | | |
| 2,2-Bis(4-methacryloxypolyethoxyphenyl)propane | | | 20.0 | 10.0 |
| Component (3) | | | | |
| 2-Hydroxyethyl methacrylate | 30.0 | 30.0 | 30.0 | 30.0 |
| 2-Hydroxypropyl methacrylate | | | | 20.0 |
| Component (4) | | | | |
| Cumene hydroperoxide | 2.4 | 2.4 | 2.4 | 6.7 |
| Component (6) | | | | |
| Acrylonitrile-butadiene rubber | 10.0 | 10.0 | 10.0 | 20.0 |
| Butadiene-styrene-methyl methacrylate copolymer | 10.0 | 10.0 | 10.0 | |
| Others | | | | |
| Paraffin (melting point: 56° C.) | 1.2 | 1.2 | 1.2 | 1.2 |
| Hydroquinone monomethyl ether | 0.3 | 0.3 | 0.3 | 0.3 |
| Amounts (unit: parts by weight) | | | | |

TABLE 2-continued

| Materials | Ex. 4 | Ex. 5 | Ex. 6 | Ex. 7 |
|---|---|---|---|---|
| Second liquid | | | | |
| Component (1) | | | | |
| Phenoxyethyl methacrylate | 50.0 | | 50.0 | 40.0 |
| Tolyloxyethyl methacrylate | | 50.0 | | |
| Component (2) | | | | |
| 2,2-Bis(4-methacryloxyethoxyphenyl)propane | 20.0 | 20.0 | | |
| 2,2-Bis(4-methacryloxypolyethoxyphenyl)propane | | | 20.0 | 10.0 |
| Component (3) | | | | |
| 2-Hydroxyethyl methacrylate | 30.0 | 30.0 | 30.0 | 30.0 |
| 2-Hydroxypropyl methacrylate | | | | 20.0 |
| Component (5) | | | | |
| Vanadyl acetylacetonate | 0.4 | 0.4 | 0.4 | 0.4 |
| Component (6) | | | | |
| Acrylonitrile-butadiene rubber | 10.0 | 10.0 | 10.0 | 20.0 |
| Butadiene-styrene-methyl methacrylate copolymer | 10.0 | 10.0 | 10.0 | |
| Others | | | | |
| Paraffin | 1.2 | 1.2 | 1.2 | 1.2 |
| Acid phosphoxyethyl methacrylate | 2.0 | 2.0 | 2.0 | 2.0 |
| Evaluation | | | | |
| SPCC/SPCC Tensile shear strength (MPa) | 22.5 | 20.8 | 23.7 | 24.6 |
| Aluminum/aluminum Tensile shear strength (MPa) | 25.6 | 17.1 | 21.8 | 21.7 |
| SPCC/SPCC peel strength (kN/m) | 4.9 | 5.2 | 7.4 | 9.1 |
| Tensile shear strength retention under humidity (%) | 89.0 | 90.8 | 86.9 | 84.8 |
| Odor | ◯ | ◯ | ◯ | ◯ |

TABLE 3

| Materials | Ex. 8 | Ex. 9 | Ex. 10 | Ex. 11 |
|---|---|---|---|---|
| Amounts (unit: parts by weight) | | | | |
| First liquid | | | | |
| Component (1) | | | | |
| Phenoxyethyl methacrylate | 50.0 | 40.0 | 20.0 | 85.0 |
| Tolyloxyethyl methacrylate | | | | |
| Component (2) | | | | |
| 2,2-Bis(4-methacryloxyethoxyphenyl)propane | | | | |
| 2,2-Bis(4-methacryloxypolyethoxyphenyl)propane | 5.0 | 30.0 | 30.0 | 5.0 |
| Component (3) | | | | |
| 2-Hydroxyethyl methacrylate | 30.0 | 20.0 | | |
| 2-Hydroxypropyl methacrylate | 15.0 | 10.0 | 50.0 | 10.0 |
| Component (4) | | | | |
| Cumene hydroperoxide | 6.0 | 8.7 | 2.4 | 2.4 |
| Component (6) | | | | |
| Acrylonitrile-butadiene rubber | 15.0 | 15.0 | 20.0 | 20.0 |
| Butadiene-styrene-methyl methacrylate copolymer | | | | |

TABLE 3-continued

| Materials | Ex. 8 | Ex. 9 | Ex. 10 | Ex. 11 |
|---|---|---|---|---|
| Amounts (unit: parts by weight) | | | | |
| Second liquid | | | | |
| Component (1) | | | | |
| Phenoxyethyl methacrylate | 50.0 | 40.0 | 20.0 | 85.0 |
| Tolyloxyethyl methacrylate | | | | |
| Component (2) | | | | |
| 2,2-Bis(4-methacryloxyethoxyphenyl)propane | | | | |
| 2,2-Bis(4-methacryloxypolyethoxyphenyl)propane | 5.0 | 30.0 | 30.0 | 5.0 |
| Component (3) | | | | |
| 2-Hydroxyethyl methacrylate | 30.0 | 20.0 | | |
| 2-Hydroxypropyl methacrylate | 15.0 | 10.0 | 50.0 | 10.0 |
| Component (5) | | | | |
| Vanadyl acetylacetonate | 0.4 | 0.4 | 0.4 | 0.4 |
| Component (6) | | | | |
| Acrylonitrile-butadiene rubber | 15.0 | 15.0 | 20.0 | 20.0 |
| Butadiene-styrene-methyl methacrylate copolymer | | | | |
| Others | | | | |
| Paraffin | 2.0 | 2.0 | 2.0 | 2.0 |
| Acid phosphoxyethyl methacrylate | 2.0 | 2.0 | 2.0 | 2.0 |
| Evaluation | | | | |
| SPCC/SPCC Tensile shear strength (MPa) | 25.1 | 30.7 | 26.8 | 13.7 |
| Aluminum/aluminum Tensile shear strength (MPa) | 22.9 | 27.5 | 20.1 | 21.7 |
| SPCC/SPCC peel strength (kN/m) | 8.7 | 4.2 | 4.2 | 11.4 |
| Tensile shear strength retention under humidity (%) | 81.6 | 89.2 | 81.5 | 92.3 |
| Odor | ◯ | ◯ | ◯ | ◯ |

TABLE 4

| Materials | Ex. 12 | Ex. 13 | Ex. 14 | Comp. Ex. 2 |
|---|---|---|---|---|
| Amounts (unit: parts by weight) | | | | |
| First liquid | | | | |
| Component (1) | | | | |
| Phenoxyethyl methacrylate | 72.0 | 40.0 | 40.0 | 40.0 |
| Tolyloxyethyl methacrylate | | | | |
| Component (2) | | | | |
| 2,2-Bis(4-methacryloxyethoxyphenyl)propane | | | | |
| 2,2-Bis(4-methacryloxypolyethoxyphenyl)propane | 18.0 | 10.0 | 10.0 | |
| Component (3) | | | | |
| 2-Hydroxyethyl methacrylate | 6.0 | 30.0 | 30.0 | 30.0 |
| 2-Hydroxypropyl methacrylate | 4.0 | 20.0 | 20.0 | 30.0 |
| Component (4) | | | | |
| Cumene hydroperoxide | 6.7 | 6.7 | 6.7 | 8.7 |
| Component (6) | | | | |
| Acrylonitrile-butadiene rubber | 20.0 | 5.0 | 35.0 | 15.0 |
| Butadiene-styrene-methyl methacrylate copolymer | | | | |

TABLE 4-continued

| Materials | Ex. 12 | Ex. 13 | Ex. 14 | Comp. Ex. 2 |
|---|---|---|---|---|
| Amounts (unit: parts by weight) Second liquid | | | | |
| Component (1) | | | | |
| Phenoxyethyl methacrylate | 72.0 | 40.0 | 40.0 | 40.0 |
| Tolyloxyethyl methacrylate | | | | |
| Component (2) | | | | |
| 2,2-Bis(4-methacryloxyethoxyphenyl)propane | | | | |
| 2,2-Bis(4-methacryloxypolyethoxyphenyl)propane | 18.0 | 10.0 | 10.0 | |
| Component (3) | | | | |
| 2-Hydroxyethyl methacrylate | 6.0 | 30.0 | 30.0 | 30.0 |
| 2-Hydroxypropyl methacrylate | 4.0 | 20.0 | 20.0 | 30.0 |
| Component (5) | | | | |
| Vanadyl acetylacetonate | 0.4 | 0.4 | 0.4 | 0.4 |
| Component (6) | | | | |
| Acrylonitrile-butadiene rubber | 20.0 | 5.0 | 35.0 | 15.0 |
| Butadiene-styrene-methyl methacrylate copolymer | | | | |
| Others | | | | |
| Acid phosphoxyethyl methacrylate | 2.0 | 2.0 | 2.0 | 2.0 |
| Evaluation | | | | |
| SPCC/SPCC Tensile shear strength (MPa) | 16.0 | 21.4 | 20.6 | 25.6 |
| Aluminum/aluminum Tensile shear strength (MPa) | 20.6 | 22.8 | 21.2 | 22.4 |
| SPCC/SPCC peel strength (kN/m) | 8.6 | 4.2 | 7.9 | 8.2 |
| Tensile shear strength retention under humidity (%) | 92.3 | 89.3 | 90.4 | 52.1 |
| Odor | ◯ | ◯ | ◯ | ◯ |

EXAMPLE 15

With respect to the curable resin composition of Example 11, the first and second liquids were mixed in equal amounts and coated on one side of a test specimen (a non-treated steel plate of SPCC-D of 100×25×1.6 mm) in an environment with a humidity of 50% at 23° C., and another specimen (the same as above) was put thereon and bonded thereto.

Then, the bonded product was aged at room temperature for 24 hours, and the surface curability of a portion squeezed out of the adherends was observed. The surface of the squeeze-out portion was sufficiently cured and good.

By the curable resin composition of the present invention, a bonded product excellent in the durability or humidity resistance with a low odor, can be obtained. By the reduction of the odor, the working environment can be improved. Thus, the industrial merit of the composition of the present invention is significant.

What is claimed is:
1. A curable resin composition, comprising:
   (1) a polymerizable vinyl monomer having a structure of the formula (A):

$$Z—O—(R_2O)_p—R_1 \quad (A)$$

wherein Z is (meth)acryloyl, $R_1$ is phenyl or phenyl substituted by $C_{1-3}$ alkyl, $R_2$ is —$C_2$—$H_4$—, —$C_3H_6$—, —$CH_2CH(CH_3)$—, —$C_4H_8$— or —$C_6H_{12}$—; and p is an integer from 1 to 10;
   (2) a polymerizable vinyl monomer having a structure of the formula (B):

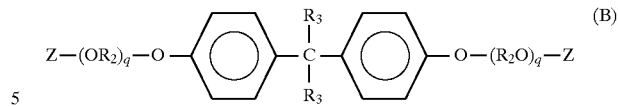

wherein Z and $R_2$ are as defined above; $R_3$ is hydrogen or $C_{1-4}$ alkyl; and q is an integer from 0 to 8;
   (3) a polymerizable vinyl monomer having a structure of the formula (C):

$$Z—O—(R_2O)_p—H \quad (C)$$

wherein Z, $R_2$ and p are as defined above;
   (4) an organic peroxide; and
   (5) a reducing agent.

2. The curable resin composition of claim 1, which further contains (6) an elastomer component.

3. The curable resin composition of claim 1, wherein the reducing agent (5) is a metal salt.

4. The curable resin composition of claim 1, wherein the polymerizable vinyl monomer (1) is selected from the group consisting of phenoxyethyl (meth)acrylate, phenoxydiethylene glycol (meth) acrylate, phenoxypolyethylene glycol (meth) acrylate, phenoxypropyl (meth) acrylate, phenoxydipropylene glycol (meth) acrylate and phenoxypolypropylene glycol (meth) acrylate.

5. The curable resin composition of claim 1, wherein the polymerizable vinyl monomer (2) is selected from the group consisting of 2,2-bis (4-(meth) acryloxyphenyl) propane, 2,2-bis (4-(meth) acryloxyethoxyphenyl propane, 2,2-bis (4-(meth) acryloxydiethoxyphenyl) propane, 2,2-bis (4-(meth) acryloxypropoxyphenyl) propane, 2,2-bis (4-(meth) acryloxytetraethoxyphenyl) propane and 2,2-bis(4-(meth) acryloxypolyethoxyphenyl) propane.

6. The curable resin composition of claim 1, wherein the polymerizable vinyl monomer (3) is selected from the group consisting of 2-hydroxyethyl (meth) acrylate, 2-hydroxypropyl (meth) acrylate, diethylene glycol mono (meth) acrylate and polypropylene glycol (meth) acrylate.

7. The curable resin composition of claim 1, wherein said organic peroxide is selected form the group consisting of cumene hydroperoxide, paramenthane hydroperoxide, tert-butyl hydroperoxide, diisopropyl benzene dihydroperoxide, methyl ethyl ketone peroxide, benzoyl peroxide and tert-butyl peroxybenzoate.

8. The curable resin composition of claim 1, wherein said reducing agent is selected from the group consisting of tertiary amines, thiourea compounds and metal salts.

9. The curable resin composition of claim 8, wherein said tertiary amines are selected from the group consisting of tiethylamine, tripropylamine, tributylamine and N,N-dimethyl p-toluidine.

10. The curable resin composition of claim 8, wherein said thiourea compounds are selected from the group consisting of 2-mercaptobenzimidazole, methylthiourea, dibutylthiourea, tetramethylthiourea and ethylenethiourea.

11. The curable resin composition of claim 8, wherein said metal salts are selected from the group consisting of cobalt naphthenate, copper naphthenate and vanadyl acetylacetonate.

12. The curable resin composition of claim 1, wherein the polymerizable vinyl monomer (1) is present in an amount of from 20 to 85 parts by wt. per 100 parts by wt. of the total amount of components (1), (2) and (3).

13. The curable resin composition of claim 1, wherein the polymerizable vinyl monomer (2) is present in an amount of from 5 to 30 parts by wt. per 100 parts by wt. of the total amount of components (1), (2) and (3).

14. The curable resin composition of claim 1, wherein the polymerizable vinyl monomer (3) is present in an amount of from 10 to 50 parts by wt. per 100 parts by wt. of the total amount of components (1), (2) and (3).

15. The curable resin composition of claim 1, wherein the organic peroxide is present in an amount of from 0.5 to 10 parts by wt. per 100 parts by wt. of the total amount of components (1), (2) and (3).

16. The curable resin composition of claim 1, wherein the reducing agent is present in an amount of from 0.05 to 10 parts by wt. per 100 parts by wt. of the total amount of components (1), (2) and (3).

17. A cured product of the curable resin composition of claim 1.

18. A bonded product, comprising adherends bonded by the cured product of claim 17.

19. The bonded product of claim 18, wherein the adherends are made of metal.

20. A method for bonding adherends, which comprises bonding said adherents with the curable resin composition of claim 1.

21. A two-pack curable resin composition, comprising a first pack and a second pack, wherein the two-pack curable resin composition comprises:

(1) a poymerizable vinyl monomer having a structure of the formula (A):

$$Z\text{-}O\text{-}(R_2O)_p R_1 \quad (A)$$

wherein Z is (meth)acryloyl, $R_1$ is phenyl or phenyl substituted by $C_{1-3}$ alkyl, $R_2$ is —$C_2H_4$—, —$C_3H_6$—, —$CH_2CH(CH_3)$—, —$C_4H_8$— or —$C_6H_{12}$—, and p is an integer of from 1 to 10;

(2) a polymerizable vinyl monomer having a structure of the formula (B):

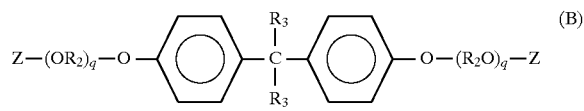

wherein Z and $R_2$ are as defined above, $R_3$ is hydrogen or $C_{1-4}$ alkyl, and q is an integer from 0 to 8, (3) a polymerizable vinyl monomer having a structure of the formula (C):

$$Z\text{-}O\text{-}(R_2O)_p\text{—}H \quad (C)$$

wherein Z, $R_2$ and p are as defined above;

(4) an organic peroxide; and (5) a reducing agent; wherein the first pack contains at least the organic peroxide (4) and the second pack contains at least the reducing agent (5).

* * * * *